United States Patent
Glatzel

[11] 3,915,558
[45] Oct. 28, 1975

[54] HIGH POWER WIDE-ANGLE LENS

[75] Inventor: Erhard Glatzel, Heidenheim (Brenz), Germany

[73] Assignee: Carl Zeiss Stiftung, Oberkochen, Germany

[22] Filed: Feb. 1, 1974

[21] Appl. No.: 438,582

[30] Foreign Application Priority Data
Feb. 9, 1973  Germany............................ 2306346

[52] U.S. Cl. ................. 350/214; 350/176; 350/189
[51] Int. Cl.² ...................... G02B 9/64; G02B 13/18
[58] Field of Search.................... 350/214, 176, 189

[56] References Cited
UNITED STATES PATENTS

| | | |
|---|---|---|
| 3,036,499 | 5/1962 | Lautenbacher..................... 350/214 |
| 3,099,701 | 7/1963 | Merigold........................ 350/189 X |
| 3,506,336 | 4/1970 | Takahashi....................... 350/214 X |
| 3,512,874 | 5/1970 | Woltche............................ 350/214 |

*Primary Examiner*—John K. Corbin
*Attorney, Agent, or Firm*—Stonebraker, Shepard & Stephens

[57] ABSTRACT

A wide-angle lens whose back focus (for remote objects at infinity) is greater than 85 percent of the equivalent focal length of the entire lens assembly, and whose relative aperture is between f/1.8 and f/1.2, with an exceptionally high photographic performance and particularly low residual aberrations of high order over an angular field of view of more than 60°. Rules or conditions are stated which, if followed, will enable the production of lenses having these desirable characteristics. Eight specific examples are given.

18 Claims, 6 Drawing Figures

HIGH POWER WIDE-ANGLE LENS

BACKGROUND OF THE INVENTION

The invention relates to wide angle lenses which are useful particularly but not exclusively in photography. Many forms of such lenses are known in the art.

BRIEF DESCRIPTION OF THE DRAWINGS

FIG. 4b is a fragmentary diagram on a larger scale, illustrating the passage of certain light rays through a portion of a lens constructed as illustrated in FIG. 4a.

SUMMARY OF THE INVENTION

This invention relates to a high power wide-angle lens whose back focus ($s'$) when focused on a remote object at infinity is greater than 85 percent of the equivalent focal length (F) of the entire lens, and whose relative aperture is between $f/1.8$ and $f/1.2$, with an exceptionally high photographic performance and with particularly low residual aberrations of high order over an angular field of view of more than 60°. In accordance with the invention, this important advance in the art is obtained by utilizing new principles of construction, described below. The objective or lens of this invention may take various specific forms, but all of them are in accordance with the principles here stated.

The objective comprises, in general, a front member (V) having four components, and a rear member (H) also having four components. The diaphragm or stop is placed in the central vertex space (CS).

Each of the four components of the front member may be made of a single individual lens element, or may be made of two or more separate elements grouped together to constitute the component. The four components of the rear member are preferably each formed of a single or individual lens element. In the following description and in the accompanying drawings, the components of the front member are consecutively numbered I to IV or 1 to 4, from front to rear, and the components of the rear member are consecutively numbered V to VIII or 5 to 8, from front to rear. The sum of the surface powers of each individual component or element is indicated by $\phi$ with a subscript indicating the particular component or element involved, and the equivalent refractive power of the entire lens is indicated by $\Phi$.

In any event, regardless of whether each component is made of only a single lens element or whether some of the components are made of two or more lens elements grouped together, there should be a first or front component of negative power, followed by a second component air spaced a finite distance rearwardly from the first component and also of negative power, but of weaker refractive power than the first component. The second component in turn is followed by a third component of positive power, followed by a fourth component of meniscus shape which is convex toward the front and of very small positive refractive power. Behind this meniscus is the central vertex space or diaphragm space, and then comes the rear member, the first component of which (fifth component of the entire lens) is of negative refractive power, followed by the sixth component which also is negative and of stronger refractive power than the fifth component. Then comes the seventh and eighth components, both of which are of positive power, separated from each other by air.

Within this general framework there are a number of rules or principles which should be followed in order to achieve to the greatest extent the beneficial results above mentioned. These additional requirements of the present invention are the following:

A. The refractive power of the second component is less than two-thirds of the refractive power of the first component.

B. The refractive power of the air lens $\alpha$ between the second component and the third component, that is, the air lens formed between the rear face of the second component and front face of the third component, is less than 0.185 times the total refractive power of the entire lens.

C. The refractive power of the fifth component, although of opposite sign, is numerically less than 0.85 times the refractive power of the third component.

D. The refractive power of the fourth component is less than 0.185 times the total refractive power of the entire objective.

E. The refractive power of the fifth component is less than 0.90 times the refractive power of the sixth component.

E'. The seventh component and eighth component are both made of glass having an average index of refraction which is greater than the isochromatic mean index of refraction of the negative fifth component.

E''. At the same time, the index of refraction of the glass from which the negative fifth component is made, is less than the arithmetic mean of the isochromatic indices of refraction of the glass from which the third component and the sixth component are made; that is, the glass from which the most strongly condensing positive part of the front member and the most strongly diverging negative part of the rear member are made.

It is within the scope of this invention that in order to obtain specific refinements in the imaging quality, that one of the components of the front member be split into two or more lens elements. This may be done with any of the components which appears suitable or which is particularly preferred by the optical designer, for instance for reasons of a favorable selection of glass. This splitting of individual components can be effected in known manner by the introduction of either cemented of air-separated inner neighboring surfaces within the component. With wide-angle lenses having a long back focus exceeding 85 percent of the equivalent focal length F, it is known in the art to split the front negative lens component into a condensing front element and a diverging element immediately behind it, which two elements as a whole have a resultant negative effect. This technique may be used, if desired, for the front component, without departing from the present invention. It is also known in the art to split a condensing component forming part of the front member of the lens, into two or more individual elements, either with the same sign or with different signs of their individual refractive powers. This technique also may be used, if desired, without departing from the present invention. Of course when using either or both of these component-splitting techniques, one must still comply with all of the various rules or principles herein stated as requirements. If a positive component of the forward member of the lens is split, this takes place in front of the weakly refracting meniscus component forming component 4. This meniscus component M is a variation of the anastigmatic zero lens (v. Hoegh's meniscus) which is introduced by the present invention for the first time into this specific type of wide-angle lens with relatively long back focus. The introduction of such a meniscus in a lens of this general type, together with the corresponding rule of dimensioning for the range of location of the sum of the refractive powers of the two outer surfaces of this meniscus forms a substantial part of the overall combination of features in accordance with the present invention.

F. Another feature of the invention is that if the positive component 3 is split into two or more partial components or lens elements, then the forward one ($3_a$) of these elements is given a stronger sum of surface refraction powers than that of the rear element ($3_b$) of this split component, to such an extent that the refractive power of element $3_b$ is less than three-quarters of the refractive power of element $3_a$. In this connection, the element $3_b$ may be either of the same sign or of the opposite sign as that of element $3_a$.

G. A preferred feature of the invention is that, if element 3 be split in the manner outlined in foregoing paragraph F, then preferably this is done in such a way that the sum of the refractive powers of the two inner surfaces facing each other (rear surface of $3_a$ and front surface of $3_b$) has only a low dioptric effective value which, in its absolute value, is less than 1/5th of the equivalent refractive power of the entire lens.

The rules or requirements set forth in the foregoing paragraphs lettered A through G may be stated in the form of mathematical formulas as follows:

$$\phi_2 < \tfrac{2}{3} \phi_1 \quad (A)$$
$$\phi_a < 0.185\, \Phi \quad (B)$$
$$0.85\, \phi_3 > -\phi_5 \quad (C)$$
$$\phi_4 < 0.185\, \Phi \quad (D)$$
$$\phi_5 < 0.90\, \phi_6 \quad (E)$$
$$n_7 > n_5 < n_8 \quad (E')$$
$$n_5 < \frac{n_3 + n_6}{2} \quad (E'')$$
$$\phi_{3b} < 0.75\, \phi_{3a} \quad (F)$$
$$0.2\, \Phi > \phi_i \gtreqless 0 \quad (G)$$

In this last formula G, the sum of the refractive powers of the inner surfaces (rear surface of element $3_a$ and forward surface of element $3_b$) is indicated by $\phi_i$, which equals $\phi'_{3a} + \phi_{3b}$. As well understood in this art, the surface power of one surface $\phi = (n' - n)$: R and the subscripts $3'_a$ and $3_b$ refer in each case to the rear surface of the element $3_a$ and front surface of the element $3_b$ respectively.

By dimensioning in this way, one avoids at this place a relatively large sum of the inner surface powers of this positive component 3, which would have an unfavorable effect on the aberrations and would reduce the sharpness of the image. At the same time this dimensioning produces an advantageous increase of the inner differences of the ray penetration heights between the adjacent inner surfaces, namely, the rear surface of element $3_a$ and the front surface of element $3_b$. In a surprising and excellent manner, this difference in height of penetration permits, specifically in the case of the present very high power lens, a definite refinement in the production of the image by wide-angle cones of light in the lateral portions of the field of view.

This matter of enlarging the inner differences of the ray penetration heights is illustrated in FIG. $4_b$, showing a construction in which the two lens elements $3_a$ and $3_b$ contain, cemented between their neighboring surfaces, an inner lens element $3_i$ of low index of refraction for the separation, whereby the above mentioned differences in height of penetration for the parallel beam of rays $\delta\, h_{a,b}$ on the one hand, and for the lateral oblique ray beam $\delta\, k_{a,b}$ on the other hand, are given a favorable relative difference in height of penetration, which may be expressed as $\delta\, n_{a,b} = \delta\, k_{a,b} - \delta\, h_{a,b}$.

This relative difference in height of penetration, on account of its dependence on the refractive powers increases to a maximum value when the medium enclosed between the elements $3_a$ and $3_b$ is air rather than glass, so that $n_i = 1$. Therefore, although some of the advantages of the invention can be attained when a glass element $3_i$ is used between the elements $3_a$ and $3_b$, all together constituting component 3, yet for attainment of the maximum advantage it is preferred to eliminate the glass element $3_i$ and space the elements $3_a$ and $3_b$ from each other by air, to form an air lens between them, and it is this air spaced arrangement which is dealt with in the specific examples relating to splitting component 3.

DESCRIPTION OF THE PREFERRED EMBODIMENTS

Eight specific examples of lenses in accordance with the invention are given below, all of which are dimensioned in accordance with the principles or rules of construction set forth above. All linear dimensions (e.g., radii, thicknesses and spacings) are given on the basis of the equivalent focal length of the entire lens assembly as unity, that is, $F = 1$. In the data tables, the radii of curvature of the front surface and the rear surface of each component or element are indicated by R and R', respectively, with a subscript indicating the number of that particular component or element. When a given component is made up of more than one element, the front element of the component is designated by the number of the component and the latter $a$, and the rear element of the component is designated by the number of the component and the letter $b$. Positive values of R or R' indicate surfaces convex toward the front of the lens, and negative values indicate surfaces concave toward the front, in accordance with the customary notation as used in lens patents. The light is assumed to pass from front to rear, in the direction of the arrows in the drawings, the front being, of course, the end faced toward the distant object or longer conjugate focus, the image being formed to the rear of the lens. Axial thicknesses are indicated by T with a subscript indicating the particular component or element, and axial spacings are indicated by S with a subscript indicating the particular component or element which is at the front of the space referred to. Zero spacing indicates lens elements cemented to each other. All spacings greater than zero refer to air spacings.

In the tables, the index of refraction of the glass used for each element is given in the column headed N. When a lens is designed for use with only a very narrow spectral range, the refractive index refers specifically to this narrow spectral range. If the lens is to be used over a wide spectral range, as for example in normal color photography, the index of refraction refers to any suitable one of the standard indices of refraction, for example, the index with reference to the yellow $d$-line of the helium spectrum, whose wavelength is 5876 Angstrom units. The refractive index based on this line is shown in many commercial catalogues of manufacturers of optical glasses.

When a lens is to be used to cover a wide spectral range, then instead of a so-called monochromatic correction of image defects, an achromatizing thereof over the wide spectral range is to be used, is required to be brought about. For this purpose, in known manner, the glasses are so chosen according to their Abbe number or index of dispersion, that the required color dispersion of the glasses used serves to eliminate the chromatic deviations caused by wavelengths which enter into consideration. In this connection it was found in the course of making this invention, by way of confirmation, that for the development of the so-called preforms for the high power wide-angle lenses of the present invention, during the course of the following technical rough shaping or production of the rough form in known manner with the normally customary initial correction in the Seidel range (3rd order), the use of one of the standard indices of refraction such as the index for the above mentioned yellow $d$-line of the visible helium spectrum, gives good results. The index of dispersion or Abbe number of the glass is shown in some of the following tables in the column headed V.

Specific data for 8 examples of the invention will be given in tabular form. But it is desired to give remarks and explanations regarding the examples in advance of the tabular data, so that the tabular data for all examples may appear consecutively without intervening explanations or interruptions.

Figure 1:
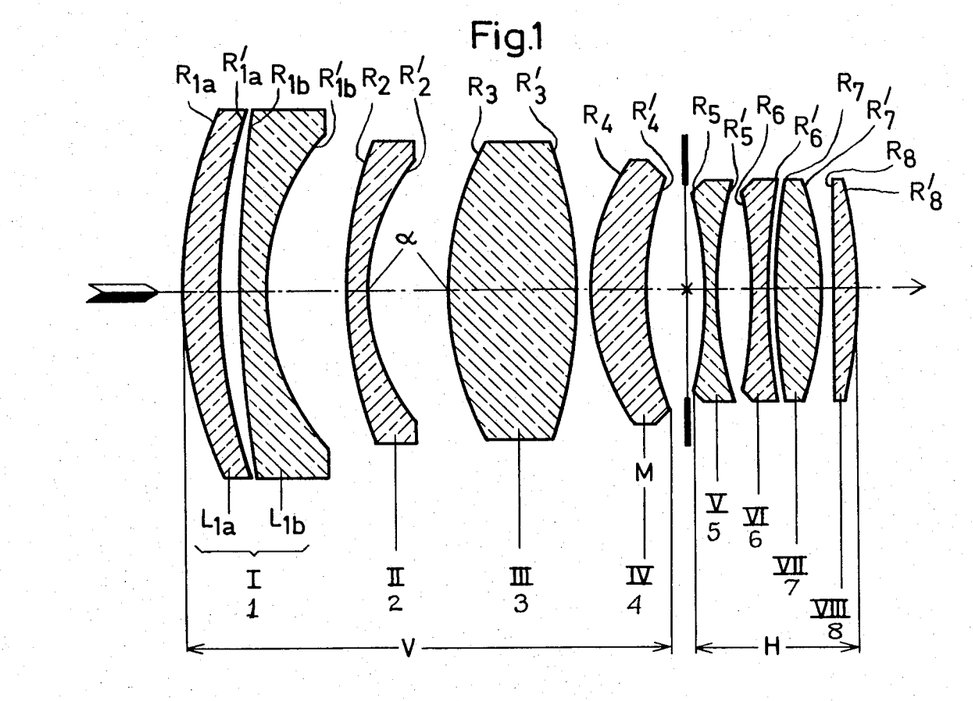
FIG. 1 is a schematic diagram illustrative of a lens in accordance with one embodiment of the invention.

Example 1, the general configuration of which is shown in FIG. 1, is a lens designed for monochromatic light. The front or first component of this lens is split into two individual elements which have opposite signs of power, but the component as a whole (that is, the two elements considered together) have a diverging or negative action. Such splitting of the front component of a wide-angle lens with a long back focus has been known frequently in the past, as for example in German Pat. Nos. 1,187,393 (FIGS. 2 and 3), 1,220,164, and 1,250,151, etc. In the past, however, such a split pair of lenses constituting the front component has always been used with an air space between them of the shape of a negative lens. As distinguished from this, in the present example 1 the thin air space between the first and second elements has been given the shape of a positive or condensing air lens. This example constitutes the preform for a lens in accordance with the present invention, having a relative aperture of f/1.75 and an angular field of view of 61°. The same radii have been used for several different surfaces. The meniscus (component 4 or M) is developed as a v. Hoegh zero lens with a corresponding sum of the surface powers ($\phi_4$) which is equal to exactly zero and thus at the same time forms the natural lower limit for the feature represented by the foregoing formula D.

Figure 2:
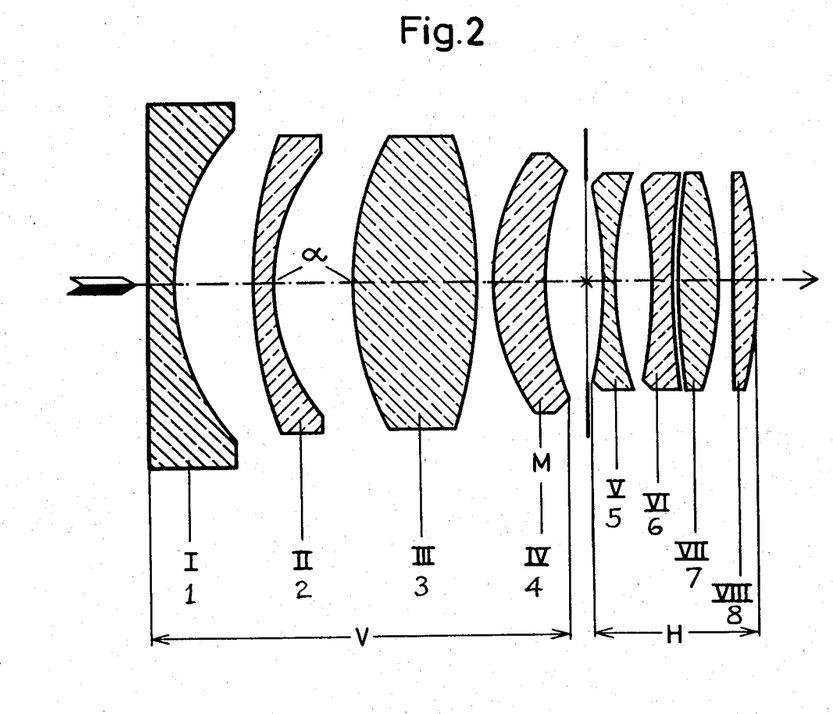
FIG. 2 is a similar diagram illustrative of lenses in accordance with other embodiments of the invention.

Example 2 is of the general configuration illustrated in FIG. 2. In this example, the first component is a single lens element of plano-concave shape, with its flat or plane surface faced forwardly. This illustrates strikingly that, contrary to the construction normally customary up to now, it is not necessary to have the front element developed as a meniscus concave toward the front. Similarly, in this example 2 the last lens element at the back of the rear member, that is, component 8, is a plano convex lens with its flat surface forwardly. This illustrates to the practical optical designer that this glass-air surface can have either a positive or a negative directional sign, since the flat surface forms the inner limiting case between the two directions of the sign.

This preform (example 2) is provided for establishing a lens having a relative aperture of f/1.6 with an angular field of view of 62°. Component 4, the meniscus element which is the last element of the front member, is convex toward the front and has the shape of a negative meniscus, so that the sum of its surface powers is negative. Also, this lens constituting example 2 is very closely based on the preceding example 1. Component 5, the initial or first lens in the rear member, is separated from the immediately following front surface of component 6 by an equiconvex air space or air lens. This specific shape shows that this air spacing, in contradistinction to the older arrangements proposed for this characteristic rear member, need not be shaped with unequal arms, even in the case of lenses of very high power and wide-angle of view. In this example 2, the overall construction is furthermore established so that the back focus (s') is equal with very great accuracy to the equivalent focal length (F) of the entire lens system, so that in this case the rear principal point of the entire system lies practically precisely at the axial vertex of the last lens surface $R'_8$.

During the course of the investigations which led to the present invention, it was found advantageous, when splitting component 3 into two or more elements of the same or opposite sign of power, to place the more strongly positive acting element at the front of this component, with a weaker element behind it and adjacent to the meniscus, and to make this stronger element ($3_a$) with such a large condensing refractive power that the absolute value of the other element ($3_b$) of this component is less than ¾ths of the sum of the surface refractive powers of the element $3_a$. This is in agreement with the rule stated in foregoing formula F. The component 3 has been split and has been dimensioned in this manner, in examples 3, 4, and 5, and in the last example 8.

Figure 3:
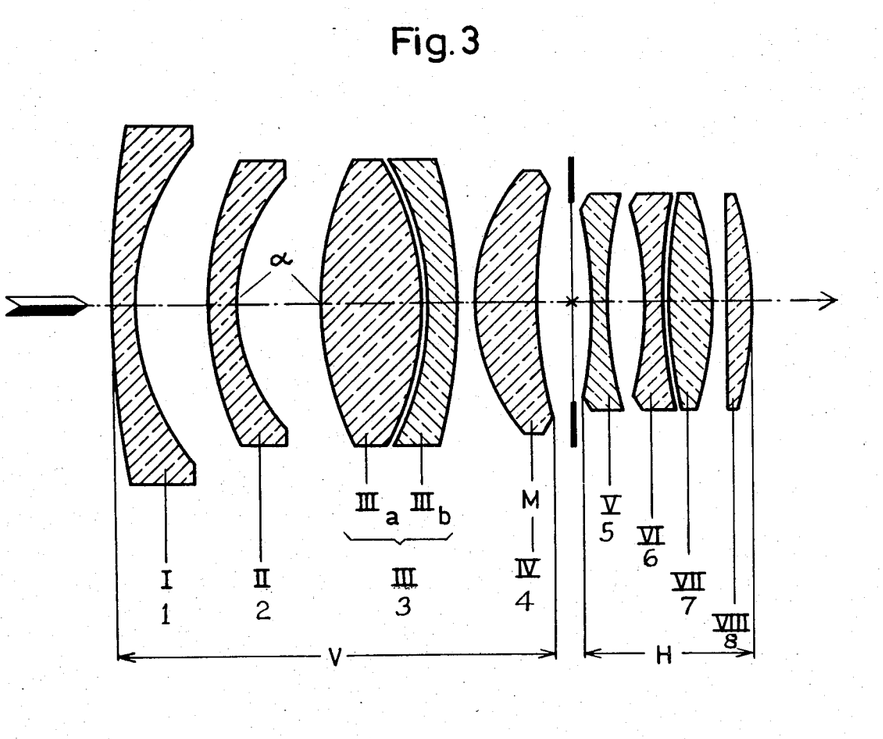
FIG. 3 is a similar diagram illustrating lenses in accordance with still other embodiments of the invention.

Example 3 is of the general configuration illustrated in FIG. 3. The positive component 3 is here split into two elements of opposite sign of power, so as to result in a doublet formed by the condensing element $3_a$ and the diverging element $3_b$, which may be cemented to each other. The meniscus component 4 which follows this component 3 has the shape of a positive meniscus convex toward the front, and accordingly the sum of its surface powers $\phi_4$ has a positive sign. In this example 3, a monochromatic error correction in the Seidel range of the third order is carried out, and in this way the transition from a development embodiment to a precorrected technical rough form is effected. The latter is thus the immediate preform for a high power finely corrected lens system of aperture f/1.5.

Example 4 is another embodiment of the general configuration of FIG. 3. It should be mentioned here that the drawings are not intended to be exactly to scale, but only illustrate the general arrangement of the elements or components of lens systems according to the various specific examples, so that one figure of the drawings may serve to illustrate more than one example, even though there may be differences in the radii, thicknesses, and spacings of one example as compared with another example illustrated by the same drawing.

In this example 4 (again referring to FIG. 3) the front member V of this lens has its main positive component 3 in the form of a cemented doublet combined out of two individual elements $3_a$ and $3_b$ of opposite sign of power, while the initial negative component 5 of the rear member H is made from a glass whose index of refraction for the contemplated operating wavelength is less than 1.50, in order in this way to obtain a still greater difference in index of refraction from that of the following diverging component 6. This objective in example 4 is intended for the recording of signals within a very narrow spectral range, and is accordingly monochromatically pre-corrected in the region of the Seidel third order, to result in a high power system of relative aperture of $f/1.5$ with an angular field of view of 62°.

Example 5, also of the general configuration illustrated in FIG. 3, also concerns a monochromatically pre-corrected lens whose relative aperture has been increased to $f/1.4$, and in which both the first radius ($R_1$) of the front member V and the first radius ($R_5$) of the rear member H are made flatter than in examples 3 and 4, and are therefore provided with a smaller curvature of surface. In example 4, the negative component 2 was made with a glass having an index of refraction less than 1.50, but in this example 5, the index of refraction of this component 2 has been increased to more than 1.60. The back focus ($s'$) in this example 5 is matched rather closely to that of the preceding example 4.

Example 6 is intended for a relative aperture of $f/1.3$, and is designed for signal imaging in a very narrow spectral range. It is a simplified structure of the general configuration illustrated in FIG. 2, the positive component 3 in the front member V consisting of a single biconvex element rather than being split into two or more elements. This objective according to example 6 is particularly suitable for photoelectronic recording, and is provided in this connection for the widely used camera tube of 1.6 inches diameter with a usable image circle of 40.0 millimeters in a characteristic focal length of $f = 33.333$ mm. as a practical embodiment, in which then a usable picture diameter of $1.2\,f$ is employed.

Example 7, also in accordance with general configuration schematically shown in FIG. 2, is a finely corrected embodiment of the lens of the present invention. This is a high power wide-angle lens intended for a relative aperture of $f/1.4$, for use in the production of color pictures, and is accordingly achromatized over that wide spectral range which is required both for negative photography and for the reversal films of modern color photography. The positive biconvex component 3 in the front member V consists of a single individual lens. The second air spacing (between component 2 and component 3) constitutes air lens $\alpha$ and this air lens has the shape of a meniscus-like condensing lens but, in distinction from the preceding example 6, it does not have a negative sum of surface powers, but rather has a very weak positive action for parallel rays near the axis.

Figure 4:
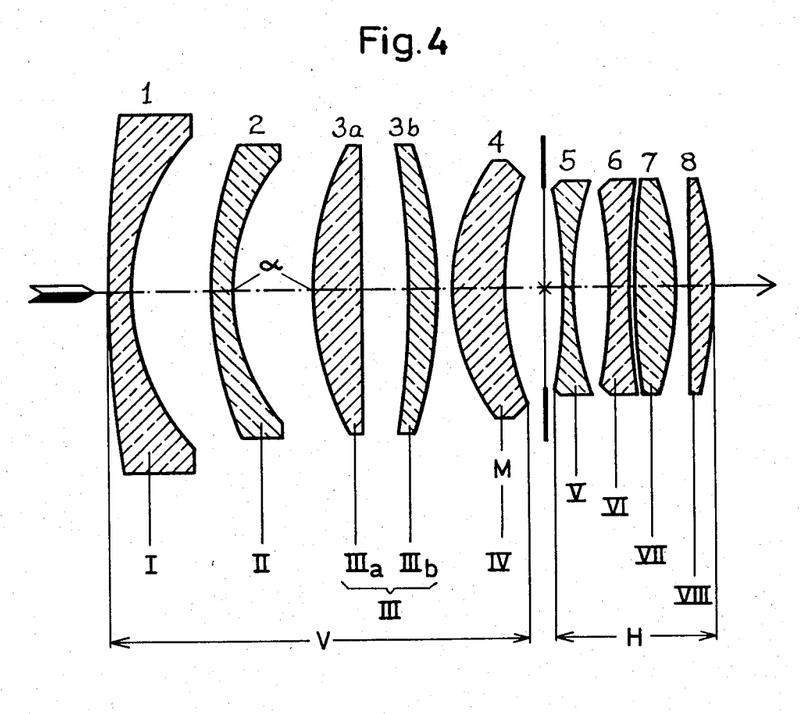
FIG. 4 is a similar diagram illustrating lenses in accordance with still other embodiments of the invention.
Figure 4A:
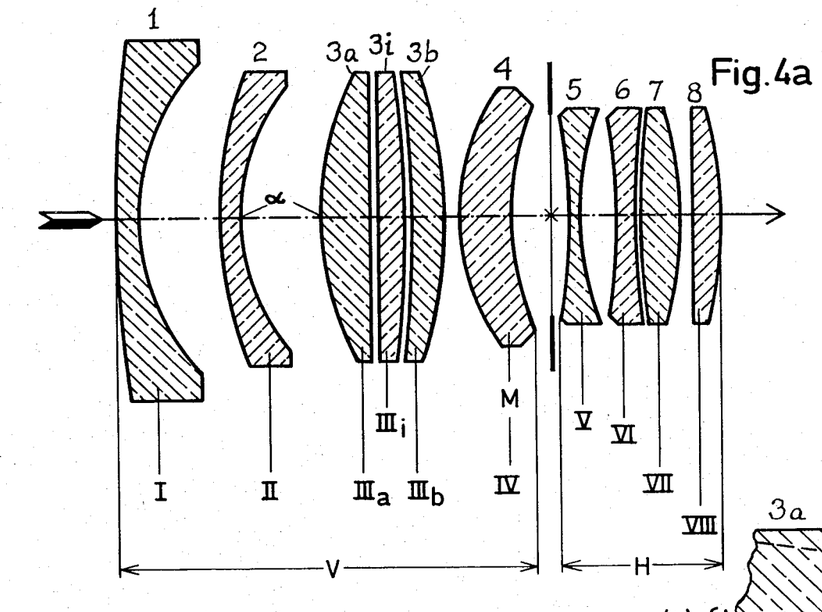
FIG. 4a is a similar diagram illustrating still another embodiment of the invention.
Figure 4B:
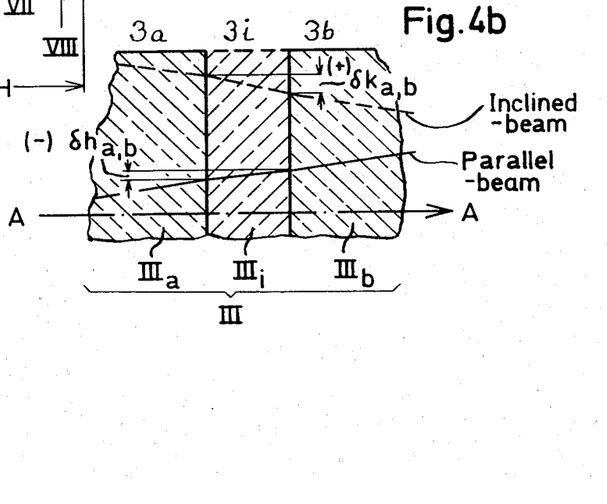

Example 8, of the general configuration schematically shown in FIG. 4 and in the supplementary view, FIG. 4a, is a further refinement of a lens intended for picture performance. In this highly refined embodiment, the positive component 3 in the front member V is formed from at least two lens elements of the same sign, which are set up at a finite axial distance between them, and enclosed between them a medium of very low refraction in order to produce that inner difference in penetration heights which, as already mentioned, constitutes such a great advance for the picture quality, particularly in the extended lateral parts of the field of view. This refers to the difference in penetration heights between the parallel rays passing through this component 3, on the one hand, and the oblique rays passing through the component, on the other hand. To make this difference in penetration height as great as possible, the medium enclosed between the front element $3_a$ and the rear element $3_b$ of this component 3 should be, as already indicated, of very low index of refraction. The filling between the elements $3_a$ and $3_b$ may consist of glass of a very low power of refraction, and has been so drawn in the auxiliary drawing, FIG. 4a, where this intermediate filling is indicated as the element $3_i$. But preferably, the elements $3_a$ and $3_b$ are separated by air, which gives the lowest possible index of refraction between these elements and therefore maximizes the desired differences in height of penetration. In auxiliary FIG. 4b, the difference in height of penetration produced by the splitting of this component into the partial components or elements $3_a$ and $3_b$ is shown schematically.

In agreement with the data indicated for this extremely finely corrected example of a lens with a relative aperture of $f/1.4$, this intermediate element $3_i$ in the component 3 is developed as an air lens in accordance with the geometrical optical conditions further described above, in order in this way to be able exhaustively to utilize the reciprocal index of refraction effect of the medium of this intermediate element to the utmost. With such a splitting of this positive component 3 there is, however, the danger of the occurrence of very disturbing aberrations of higher order, particularly in the side field of view, as soon as it is attempted to use this inner air lens for an increase in the speed (relative aperture) of the entire system by providing the enclosed limiting surfaces (rear surface of element $3_a$ and front surface of element $3_b$) with greater condensing refractive powers of their own which supply, as the sum of the surface refractive powers, a substantial contribution to the equivalent refractive power of the entire lens, somewhat more than one-fourth or even more than one-third of the latter. In order definitely to avoid reduction in the desired high sharpness of picture which is possible in this direction but undesired, particularly for the wide-open cross section of the bundle of rays, the condition set forth in foregoing formula G has been fully complied with in this example 8.

| Lens | Radii | Example 1<br>$F = 1.0000$  $f/1.75$  $s' = +0.9931\,F$<br>Thicknesses and Spacings | N |
|---|---|---|---|
| 1a | $R_{1a} = +6.00$ | $T_{1a} = 0.081$ | 1.620 |
|  | $R'_{1a} = +10.00$ | $S_{1a} = 0.029$ |  |
| 1b | $R_{1b} = +36.00$ | $T_{1b} = 0.045$ | 1.570 |
|  | $R'_{1b} = +0.92$ | $S_{1b} = 0.320$ |  |

-Continued

Example 1
F = 1.0000  f/1.75  s' = + 0.9931 F

| Lens | Radii | Thicknesses and Spacings | N |
|---|---|---|---|
| 2 | $R_2 = + 1.40$ | $T_2 = 0.080$ | 1.508 |
|  | $R'_2 = + 0.92$ |  |  |
|  |  | $S_2 = 0.358$ (α) |  |
| 3 | $R_3 = + 1.40$ | $T_3 = 0.282$ | 1.713 |
|  | $R'_3 = - 1.96$ |  |  |
|  |  | $S_3 = 0.010$ |  |
| 4 | $R_4 = + 0.80$ | $T_4 = 0.240$ | 1.713 |
|  | $R'_4 = + 0.80$ |  |  |
|  |  | $S_4 = 0.240 =$ CS |  |
| 5 | $R_5 = - 6.00$ | $T_5 = 0.075$ | 1.508 |
|  | $R'_5 = + 1.50$ |  |  |
|  |  | $S_5 = 0.110$ |  |
| 6 | $R_6 = - 1.50$ | $T_6 = 0.035$ | 1.847 |
|  | $R'_6 = + 0.92$ |  |  |
|  |  | $S_6 = 0.00$ |  |
| 7 | $R_7 = + 0.92$ | $T_7 = 0.240$ | 1.788 |
|  | $R'_7 = - 0.92$ |  |  |
|  |  | $S_7 = 0.001$ |  |
| 8 | $R_8 = - 36.00$ | $T_8 = 0.095$ | 1.788 |
|  | $R'_8 = - 1.65985$ |  |  |

Example 2
F = 1.0000  f/1.6  s' = + 1.0000 F

| Lens | Radii | Thicknesses and Spacings | N |
|---|---|---|---|
| 1 | $R_1 = \pm$ plane | $T_1 = 0.065$ | 1.565 |
|  | $R'_1 = + 1.00$ |  |  |
|  |  | $S_1 = 0.300$ |  |
| 2 | $R_2 = + 1.40$ | $T_2 = 0.080$ | 1.508 |
|  | $R'_2 = + 0.92$ |  |  |
|  |  | $S_2 = 0.355$ (α) |  |
| 3 | $R_3 = + 1.40$ | $T_3 = 0.280$ | 1.713 |
|  | $R'_3 = - 1.92$ |  |  |
|  |  | $S_3 = 0.015$ |  |
| 4 | $R_4 = + 0.81$ | $T_4 = 0.240$ | 1.713 |
|  | $R'_4 = + 0.79$ |  |  |
|  |  | $S_4 = 0.250 =$ CS |  |
| 5 | $R_5 = - 6.00$ | $T_5 = 0.075$ | 1.508 |
|  | $R'_5 = + 1.50$ |  |  |
|  |  | $S_5 = 0.110$ |  |
| 6 | $R_6 = - 1.50$ | $T_6 = 0.035$ | 1.847 |
|  | $R'_6 = + 0.92$ |  |  |
|  |  | $S_6 = 0.00$ |  |
| 7 | $R_7 = + 0.92$ | $T_7 = 0.240$ | 1.788 |
|  | $R'_7 = - 0.92$ |  |  |
|  |  | $S_7 = 0.001$ |  |
| 8 | $R_8 = \pm$ plane | $T_8 = 0.104574$ | 1.788 |
|  | $R'_8 = - 1.66895$ |  |  |

Example 3
F = 1.0000  f/1.5  s' = + 1.0336 F

| Lens | Radii | Thicknesses and Spacings | N |
|---|---|---|---|
| 1 | $R_1 = + 2.368$ | $T_1 = 0.0667$ | 1.662 |
|  | $R'_1 = + 0.912$ |  |  |
|  |  | $S_1 = 0.1425$ |  |
| 2 | $R_2 = + 1.558$ | $T_2 = 0.0672$ | 1.435 |
|  | $R'_2 = + 0.802$ |  |  |
|  |  | $S_2 = 0.4096$ (α) |  |

-Continued

Example 3
F = 1.0000  f/1.5  s' = + 1.0336 F

| Lens | Radii | Thicknesses and Spacings | N |
|---|---|---|---|
| 3a | $R_{3a} = + 1.129$ | $T_{3a} = 0.6026$ | 1.721 |
|  | $R'_{3a} = - 0.723$ |  |  |
|  |  | $S_{3a} = 0.0000$ |  |
| 3b | $R_{3b} = - 0.723$ | $T_{3b} = 0.0687$ | 1.730 |
|  | $R'_{3b} = - 1.880$ |  |  |
|  |  | $S_{3b} = 0.0014$ |  |
| 4 | $R_4 = + 0.842$ | $T_4 = 0.0945$ | 1.731 |
|  | $R'_4 = + 1.017$ |  |  |
|  |  | $S_4 = 0.1860 =$ CS |  |
| 5 | $R_5 = - 2.439$ | $T_5 = 0.0455$ | 1.516 |
|  | $R'_5 = + 1.086$ |  |  |
|  |  | $S_5 = 0.1476$ |  |
| 6 | $R_6 = - 1.205$ | $T_6 = 0.0343$ | 1.847 |
|  | $R'_6 = + 1.300$ |  |  |
|  |  | $S_6 = 0.0000$ |  |
| 7 | $R_7 = + 1.300$ | $T_7 = 0.2574$ | 1.788 |
|  | $R'_7 = - 0.840$ |  |  |
|  |  | $S_7 = 0.0020$ |  |
| 8 | $R_8 = + 2.680$ | $T_8 = 0.1000$ | 1.788 |
|  | $R'_8 = - 3.65657$ |  |  |

Example 4
F = 1.0000  f/1.5  s' = + 0.9863 F

| Lens | Radii | Thicknesses and Spacings | N |
|---|---|---|---|
| 1 | $R_1 = + 2.650$ | $T_1 = 0.0670$ | 1.626 |
|  | $R'_1 = + 0.790$ |  |  |
|  |  | $S_1 = 0.1360$ |  |
| 2 | $R_2 = + 1.237$ | $T_2 = 0.0900$ | 1.459 |
|  | $R'_2 = + 0.891$ |  |  |
|  |  | $S_2 = 0.4705$ (α) |  |
| 3a | $R_{3a} = + 1.164$ | $T_{3a} = 0.5370$ | 1.742 |
|  | $R'_{3a} = - 0.738$ |  |  |
|  |  | $S_{3a} = 0.0000$ |  |
| 3b | $R_{3b} = - 0.738$ | $T_{3b} = 0.0610$ | 1.773 |
|  | $R'_{3b} = - 1.771$ |  |  |
|  |  | $S_{3b} = 0.0025$ |  |
| 4 | $R_4 = + 0.827$ | $T_4 = 0.1045$ | 1.730 |
|  | $R'_4 = + 1.015$ |  |  |
|  |  | $S_4 = 0.1830 =$ CS |  |
| 5 | $R_5 = - 3.625$ | $T_5 = 0.0525$ | 1.492 |
|  | $R'_5 = + 0.832$ |  |  |
|  |  | $S_5 = 0.1830$ |  |
| 6 | $R_6 = - 1.216$ | $T_6 = 0.0350$ | 1.847 |
|  | $R'_6 = + 1.040$ |  |  |
|  |  | $S_6 = 0.0000$ |  |
| 7 | $R_7 = + 1.040$ | $T_7 = 0.2145$ | 1.787 |
|  | $R'_7 = - 1.040$ |  |  |
|  |  | $S_7 = 0.0020$ |  |
| 8 | $R_8 = + 3.735$ | $T_8 = 0.0970$ | 1.788 |
|  | $R'_8 = - 1.7114$ |  |  |

Example 5
F = 1.0000  f/1.4  s' = + 0.98739 F

| Lens | Radii | Thicknesses and Spacings | N |
|---|---|---|---|
| 1 | $R_1 = + 4.171$ | $T_1 = 0.0660$ | 1.623 |
|  | $R'_1 = + 0.783$ |  |  |
|  |  | $S_1 = 0.1940$ |  |
|  | $R_2 = + 2.351$ |  |  |

Example 5

F = 1.0000  f/1.4  s' = + 0.98739 F

| Lens | Radii | Thicknesses and Spacings | N |
|---|---|---|---|
| 2 | | $T_2 = 0.1020$ | 1.617 |
| | $R'_2 = + 1.426$ | $S_2 = 0.2930\ (\alpha)$ | |
| 3a | $R_{3a} = + 1.253$ | $T_{3a} = 0.5390$ | 1.713 |
| | $R'_{3a} = - 0.795$ | $S_{3a} = 0.0000$ | |
| 3b | $R_{3b} = - 0.795$ | $T_{3b} = 0.0660$ | 1.749 |
| | $R'_{3b} = - 1.688$ | $S_{3b} = 0.0020$ | |
| 4 | $R_4 = + 0.777$ | $T_4 = 0.1730$ | 1.731 |
| | $R'_4 = + 0.916$ | $S_4 = 0.2160 = CS$ | |
| 5 | $R_5 = - 4.710$ | $T_5 = 0.0500$ | 1.461 |
| | $R'_5 = + 0.968$ | $S_5 = 0.1670$ | |
| 6 | $R_6 = - 1.310$ | $T_6 = 0.0500$ | 1.847 |
| | $R'_6 = + 1.310$ | $S_6 = 0.0000$ | |
| 7 | $R_7 = + 1.310$ | $T_7 = 0.2000$ | 1.788 |
| | $R'_7 = - 0.979$ | $S_7 = 0.0020$ | |
| 8 | $R_8 = + 6.916$ | $T_8 = 0.1100$ | 1.788 |
| | $R'_8 = - 1.6943$ | | |

Example 6

F = 1.0000  f/1.3  s' = + 0.99105 F

| Lens | Radii | Thicknesses and Spacings | N |
|---|---|---|---|
| 1 | $R_1 = + 9.870$ | $T_1 = 0.0650$ | 1.575 |
| | $R'_1 = + 0.961$ | $S_1 = 0.2950$ | |
| 2 | $R_2 = + 1.495$ | $T_2 = 0.0840$ | 1.509 |
| | $R'_2 = + 0.920$ | $S_2 = 0.3650\ (\alpha)$ | |
| 3 | $R_3 = + 1.341$ | $T_3 = 0.3900$ | 1.713 |
| | $R'_3 = - 2.047$ | $S_3 = 0.0010$ | |
| 4 | $R_4 = + 0.805$ | $T_4 = 0.2400$ | 1.713 |
| | $R'_4 = + 0.825$ | $S_4 = 0.2400 = CS$ | |
| 5 | $R_5 = - 6.005$ | $T_5 = 0.0650$ | 1.509 |
| | $R'_5 = + 1.410$ | $S_5 = 0.1000$ | |
| 6 | $R_6 = - 1.508$ | $T_6 = 0.0600$ | 1.847 |
| | $R'_6 = + 0.920$ | $S_6 = 0.0000$ | |
| 7 | $R_7 = + 0.920$ | $T_7 = 0.2400$ | 1.788 |
| | $R'_7 = - 0.979$ | $S_7 = 0.0100$ | |
| 8 | $R_8 = + 25.40$ | $T_8 = 0.0950$ | 1.788 |
| | $R'_8 = - 1.68068$ | | |

Example 7

F = 1.00000  f/1.4  s' = + 0.98631 F

| Lens | Radii | Thicknesses and Spacings | N | V |
|---|---|---|---|---|
| 1 | $R_1 = + 6.4168$ | $T_1 = 0.06664$ | 1.5814 | 40.9 |
| | $R'_1 = + 0.9717$ | $S_1 = 0.24624$ | | |
| 2 | $R_2 = + 1.7468$ | $T_2 = 0.07661$ | 1.4645 | 65.7 |
| | $R'_2 = + 0.8874$ | $S_2 = 0.36996\ (\alpha)$ | | |
| 3 | $R_3 = + 1.2616$ | $T_3 = 0.41826$ | 1.7130 | 53.9 |
| | $R'_3 = - 2.0567$ | $S_3 = 0.00144$ | | |
| 4 | $R_4 = + 0.8957$ | $T_4 = 0.23761$ | 1.7130 | 53.9 |
| | $R'_4 = + 1.0042$ | $S_4 = 0.18149 = CS$ | | |
| 5 | $R_5 = - 3.7242$ | $T_5 = 0.13173$ | 1.4645 | 65.7 |
| | $R'_5 = + 1.0370$ | $S_5 = 0.12334$ | | |
| 6 | $R_6 = - 1.7566$ | $T_6 = 0.02709$ | 1.8467 | 23.8 |
| | $R'_6 = + 0.8323$ | $S_6 = 0.00000$ | | |
| 7 | $R_7 = + 0.8323$ | $T_7 = 0.23932$ | 1.7883 | 47.4 |
| | $R'_7 = - 1.0578$ | $S_7 = 0.00170$ | | |
| 8 | $R_8 = + 6.2880$ | $T_8 = 0.10385$ | 1.7883 | 47.4 |
| | $R'_8 = - 1.75655$ | | | |

Example 8

F = 1.0000  f/1.4  s' = + 0.98567 F

| Lens | Radii | Thicknesses and Spacings | N | V |
|---|---|---|---|---|
| 1 | $R_1 = + 8.3325$ | $T_1 = 0.06327$ | 1.5827 | 46.5 |
| | $R'_1 = + 0.9281$ | $S_1 = 0.32654$ | | |
| 2 | $R_2 = + 1.3301$ | $T_2 = 0.09243$ | 1.5481 | 45.8 |
| | $R'_2 = + 0.9281$ | $S_2 = 0.33507\ (\alpha)$ | | |
| 3a | $R_{3a} = + 1.3016$ | $T_{3a} = 0.18569$ | 1.7130 | 53.9 |
| | $R'_{3a} = - 11.273$ | $S_{3a} = 0.08308$ | | |
| 3b | $R_{3b} = - 47.565$ | $T_{3b} = 0.13480$ | 1.7130 | 53.9 |
| | $R'_{3b} = - 2.0928$ | $S_{3b} = 0.00138$ | | |
| 4 | $R_4 = + 0.7809$ | $T_4 = 0.18377$ | 1.7130 | 53.9 |
| | $R'_4 = + 0.8332$ | $S_4 = 0.23576 = CS$ | | |
| 5 | $R_5 = - 6.9100$ | $T_5 = 0.06768$ | 1.5481 | 45.8 |
| | $R'_5 = + 1.1271$ | $S_5 = 0.12765$ | | |
| 6 | $R_6 = - 1.1854$ | $T_6 = 0.04429$ | 1.8467 | 23.8 |
| | $R'_6 = + 1.3987$ | $S_6 = 0.00000$ | | |
| 7 | $R_7 = + 1.3987$ | $T_7 = 0.19917$ | 1.7883 | 47.4 |
| | $R'_7 = - 0.9416$ | $S_7 = 0.01706$ | | |
| 8 | $R_8 = + 8.8250$ | $T_8 = 0.10536$ | 1.7883 | 47.4 |
| | $R'_8 = - 1.50293$ | | | |

The foregoing specific examples, in order to facilitate a comparison between them, have been developed in the manner that the last three components of the rear member H consist of glasses which in each case belong to the same type of glass. Furthermore, the particular glasses of the components 6 and 7 are so dimensioned that the inner neighboring radii $R'_6$ and $R_7$ are developed similarly both in length as well as in sign, without impairment of the desired high picture quality. In this way the possibility is given to the practical optical designer to cement these two surfaces and thus to exclude the danger of the wide-open oblique ray beam for the lateral portions of the picture approaching too closely to the limit angle of total reflection at these surfaces. This danger could arise in the case of beams of very large cross section corresponding to their very high relative aperture in and outside the axis, especially for the outer edge rays, if relatively strongly curved surface radii of specifically these neighboring surfaces were to include an air space between them at this place, caused for instance by the selection of the glass. When using only smaller relative apertures and when possibly using relatively flat radii, the above mentioned danger of the occurrence of additional vignetting does not occur, however, at this place, since in that case the oblique ray penetration angles become correspondingly smaller, and therefore move more and more away from the danger zone of the limit-angle region of total reflection.

This last mentioned case is, however, only of importance when a finite difference in radii is to be introduced between the two said inner neighboring surfaces $R'_6$ and $R_7$, in order for a predetermined selection of glass still to be able to effect those specific correction refinements which could not be technically able to be realized with specifically that selection of glass in the case of equality of radii and of an infinitesimally small distance between the two surfaces (as in the case of cementing), and a change in the predetermined selection of glass should be impossible for any other reasons.

In addition to this, the examples show that as a result of the new principles of construction herein set forth, the optical designer has been provided with a very wide room for variations. In order to simplify a clear view of the eight specific examples of the invention as given above, there are here given in the following table I the numerical values for each individual example, with regard to the various partial features referred to in foregoing formulae A, B, and C. In addition, it should be noted in particular that the sum of the surface powers ($\phi_a$) of the two radii of curvature enclosing the air lens $\alpha$ can be made either negative or positive, in which connection no correspondingly shaped additional example has been given for the inner limit case ($\phi_a = \pm 0$) between the two signs.

Table I

| Feature | A | B | $\phi_5$ | C |
|---|---|---|---|---|
| Example | | | | |
| 1 | $0.33663\phi_1$ | $-0.04289\Phi$ | $-0.42333\Phi$ | $=-0.48488\phi_3$ |
| 2 | $0.33508\phi_1$ | $-0.04289\Phi$ | $-0.42333\Phi$ | $=-0.48071\phi_3$ |
| 3 | $0.60147\phi_1$ | $+0.09655\Phi$ | $-0.68733\Phi$ | $=-0.67676\phi_3$ |
| 4 | $0.25838\phi_1$ | $+0.12263\Phi$ | $-0.72677\Phi$ | $=-0.70376\phi_3$ |
| 5 | $0.26363\phi_1$ | $+0.13607\Phi$ | $-0.57423\Phi$ | $=-0.59369\phi_3$ |
| 6 | $0.39663\phi_1$ | $-0.02321\Phi$ | $-0.44544\Phi$ | $=-0.50611\phi_3$ |
| 7 | $0.50712\phi_1$ | $+0.04173\Phi$ | $-0.57264\Phi$ | $=-0.62801\phi_3$ |
| 8 | $0.31997\phi_1$ | $-0.04282\Phi$ | $-0.56564\Phi$ | $=-0.60385\phi_3$ |

In this table, the column headed A gives the sum of the surface refractive power $\phi_2$ of the second component as a ratio or proportion of the sum of the surface refractive power $\phi_1$ of the first component, and it will be seen from the figures in column A that all eight of the specific examples fulfill the requirements of foregoing formula A. In the column headed B, the sum of the surface refractive power $\phi_a$ of the air lens $\alpha$ (between component 2 and component 3) is given as a ratio or proportion of the refractive power $\Phi$ of the entire lens system, and it will be seen from this column B that all of the examples fulfill the condition set forth in foregoing formula B.

In the next column, headed $\phi_5$, the refractive power of component 5 is given in accordance with its effective value as a ratio to the total refractive power of the entire lens, and in the column headed C the same effective value of the refractive power of component 5 is given as a ratio or proportion, of the refractive power of the third component. It will be seen from the information in column C that all eight of the specific examples comply fully with the rule stated in foregoing formula C.

In Table II below a corresponding compilation is given for the effective values of the sum of the surface powers $\phi_4$ for the modification of the v. Hoegh meniscus as a proportion of the total refractive power $\Phi$ of the entire lens, these figures being given in the column headed D. If this meniscus is to be split up for any reason, the sum of all individual surface refractive powers of this meniscus, which is then a composite meniscus, enters into the scope of the dimensioning of the meniscus to fulfill the requirements set forth in foregoing formula D, and it is seen from column D of Table II that all of the examples fulfill the requirement of formula D. Also, in Table II below, the column headed E gives the sum of the surface refractive power $\phi_5$ of component 5, as a ratio to the sum of the surface refractive power $\phi_6$ of component 6, but without indication of a sign, since the components 5 and 6 both have a diverging effect and accordingly a negative lens refractory power. Again it is seen, from the figures in column E, that all examples comply with the requirements of foregoing formula E.

In examples 3, 4, 5, and 8, component 3 has been split into two individual lens elements $3_a$ and $3_b$. The column headed F in Table II gives, for these examples, the sum of the surface refractive power $\phi_{3b}$ of lens element 3b as a ratio of the surface refractive power $\phi_{3a}$ of lens element 3a, these figures showing that these four examples in which component 3 is split, all comply with the foregoing formula F relating to the splitting of such component. The plus and minus signs in column F are given to indicate that the splitting of component 3 has been effected into lens elements of opposite sign or the same sign.

Finally, in the last column of Table II, headed G, there is given for example 8, the sum of the inner surface refractive power $\phi_i$ of the inner lens formed between elements 3a and 3b, as a ratio of the total refractive power $\Phi$ of entire lens, showing that, in accordance with foregoing formula G, this refractive power $\phi_i$ has a low sum in order, at this place in the positive component 3, between the aberration-free course of the beam in the object space and the place of ray penetration in the plane of the diaphragm, to avoid definitely an additional occurrence of the undesired aberrations described above.

Table II

| Feature Example | D | E | F | G |
|---|---|---|---|---|
| 1 | $\pm 0$ | $0.28501\ \phi_6$ | — | — |
| 2 | $-0.02228\ \Phi$ | $0.28501\ \phi_6$ | — | — |
| 3 | $+0.14919\ \Phi$ | $0.50769\ \phi_6$ | $(-)\ 0.37949\ \phi_{3a}$ | — |

Table II-Continued

| Feature Example | D | E | F | G |
|---|---|---|---|---|
| 4 | $+0.16308\ \Phi$ | $0.48576\ \phi_6$ | $(-)\ 0.37123\ \phi_{3a}$ | — |
| 5 | $+0.14349\ \Phi$ | $0.44636\ \phi_6$ | $(-)\ 0.34021\ \phi_{3a}$ | — |
| 6 | $+0.01885\ \Phi$ | $0.30137\ \phi_6$ | — | — |
| 7 | $+0.08602\ \Phi$ | $0.38381\ \phi_6$ | — | — |
| 8 | $+0.05744\ \Phi$ | $0.42866\ \phi_6$ | $(+)\ 0.53301\ \phi_{3a}$ | $+0.06956\ \Phi$ |

The new objectives of the present invention are well suited for the development of at least one of the lens surfaces as an aspherical surface, and it is part of the present invention to select, for the aspherical surface, a lens surface which as far as possible lies in the vicinity of the diaphragm space and therefore preferably at a place of relatively small lens diameter. One can use the aspherical deformation either on a convex lens surface or on a concave lens surface. For the sake of enabling a uniform comparison, in all of the specific examples except 1 and 2, an aspherical surface was used for the front concave surface of component 5, that is, the concave front surface of the front lens element of the rear member H, facing the longer conjugate focus. This was developed as an aspherical surface with a pre-correction or fine-correction, respectively.

The aspherical shaping of a deformed lens surface is determined, as known in the art, by the camber expression:

$$P = c_1.H^2 + c_2.H^4 + c_3.H^6 + c_4.H^8 + c_5.H^{10},$$

wherein H is the height perpendicular to the axis at its corresponding surface penetration place, and the values of c for the individual examples are as follows:

Example 3. $c_1 = (2R_5)^{-1}$   $c_2 = -6.8167258 \cdot 10^{-1}$
$c_3 = 0$   $c_4 = 0$   $c_5 = 0$ Example 4. $c_1 = (2R_5)^{-1}$   $c_2 = -6.9927605 \cdot 10^{-1}$
$c_3 = -3.3707146 \cdot 10^{-3}$
$c_4 = -6.5514705 \cdot 10^{-4}$
$c_5 = -1.4261777 \cdot 10^{-4}$ Example 5. $c_1 = (2R_5)^{-1}$   $c_2 = -9.0812881 \cdot 10^{-1}$
$c_3 = +1.2906443 \cdot 10^{-1}$   $c_4 = 0$
$c_5 = 0$ Example 6. $c_1 = (2R_5)^{-1}$   $c_2 = -8.6653823 \cdot 10^{-1}$
$c_3 = 0$   $c_4 = 0$   $c_5 = 0$ Example 7. $c_1 = (2R_5)^{-1}$   $c_2 = -7.0914772 \cdot 10^{-1}$
$c_3 = 0$   $c_4 = 0$   $c_5 = 0$ Example 8. $c_1 = (2R_5)^{-1}$   $c_2 = -7.9340850 \cdot 10^{-1}$
$c_3 = 0$   $c_4 = 0$   $c_5 = 0$ In all of these cases, the radius $R_5$ is the vertex radius of the concave surface at the place of its surface intersection point with the optical axis.

What is claimed is:

1. A very high power wide-angle lens having eight lens components formed into a front member of four components and a rear member of four components separated from the front member by a diaphragm space, the first component, considering the components as numbered consecutively from front to rear, being a negative component of strong refractive power, the second component being air spaced from the first component and being a negative component of weaker refractive power, the third component being air spaced from the second component and having positive power, the fourth component being a meniscus with a convex front surface and having not more than a slight refractive power, the fifth and sixth components both being negative and being separated from each other by air space, the seventh and eighth components both being positive and being separated from each other by air space and both having rear surfaces which are convex toward the rear, said components being so constructed that they substantially fulfill simultaneously all of the following conditions:

a. the sum of the surface refractive powers ($\phi_2$) of the second component is not more than 0.60147 of the surface refractive powers ($\phi_1$) of the first component;

b. the sum of the surface refractive powers ($\phi_a$) of the two surfaces limiting the air lens space between the second component and the third component being less than 0.13607 times the equivalent refractive power ($\Phi$) of the entire lens;

c. the sum of the absolute value of the surface refractive powers ($\phi_5$) of the fifth component is less than 0.70376 times the sum of the surface refractive powers ($\phi_3$) of the third component;

d. the sum of the surface refractive powers ($\phi_4$) of the meniscus fourth component is less than 0.16308 times the equivalent refractive power ($\Phi$) of the entire lens;

e. the sum of the surface refractive powers ($\phi_5$) of the fifth component is not more than 0.50769 times the sum of the surface refractive powers ($\phi_6$) of the sixth component;

f. the refractive indices ($n_7$ and $n_8$) of the glasses from which the seventh and eighth components are made are greater than the refractive index ($n_5$) of the glass from which the fifth component is made; and g. the refractive index ($n_5$) of the glass from which the fifth component is made is less than the arithmetical means mean the isochromatic indices of refraction ($n_3$ and $n_6$) of the glasses from which the third and sixth components are made.

2. A lens as defined in claim 1, wherein the third component is formed of at least two lens elements, the front element (3a) of which has such relationship to the rear element (3b) that the absolute value of the sum of the surface refractive power ($\phi_{3b}$) of said rear element is not more than 0.53301 times the sum of the surface refractive powers ($\phi_{3a}$) of said front element.

3. A lens as defined in claim 2, wherein there is an intermediate lens (3i) between said front element (3a) and said rear element (3b) of said third component, and wherein the sum of the surface refractive powers ($\phi_1$) of said intermediate lens is less than 0.06956 times the equivalent refractive power ($\Phi$) of the entire lens system.

4. A lens as defined in claim 3, wherein said intermediate lens is an air lens.

5. A lens as defined in claim 1, wherein at least one of the component surfaces adjoining air is developed as an aspherical deformed surface.

6. A lens as defined in claim 5, wherein said aspherical deformed surface is a surface in the vicinity of said diaphragm space and has a relatively small outer diameter.

7. A lens as defined in claim 1, wherein each of said eight components from only a single lens element.

8. A lens as defined in claim 1, wherein a majority of said eight components are formed from only a single lens element and at least one component is formed from a plurality of lens elements.

9. A lens as defined in claim 8, wherein said first component is formed from a plurality of lens elements.

10. A lens as defined in claim 1, wherein said sixth component and said seventh component are cemented to each other.

11. A lens as defined in claim 1, wherein the characteristics of the lens components and their spatial relationship to each other are substantially in the proportions indicated by the data in the following table:

| Lens | Radii | Thicknesses and Spacings | N |
|---|---|---|---|
| 1a | $R_{1a} = +6.00$ | $T_{1a} = 0.081$ | 1.620 |
|  | $R'_{1a} = +10.00$ |  |  |
|  |  | $S_{1a} = 0.029$ |  |
| 1b | $R_{1b} = +36.00$ | $T_{1b} = 0.045$ | 1.570 |
|  | $R'_{1b} = +0.92$ |  |  |
|  |  | $S_{1b} = 0.320$ |  |
| 2 | $R_2 = +1.40$ | $T_2 = 0.080$ | 1.508 |
|  | $R'_2 = +0.92$ |  |  |
|  |  | $S_2 = 0.358\ (\alpha)$ |  |
| 3 | $R_3 = +1.40$ | $T_3 = 0.282$ | 1.713 |
|  | $R'_3 = -1.96$ |  |  |
|  |  | $S_3 = 0.010$ |  |
| 4 | $R_4 = +0.80$ | $T_4 = 0.240$ | 1.713 |
|  | $R'_4 = +0.80$ |  |  |
|  |  | $S_4 = 0.240 = CS$ |  |
| 5 | $R_5 = -6.00$ | $T_5 = 0.075$ | 1.508 |
|  | $R'_5 = +1.50$ |  |  |
|  |  | $S_5 = 0.110$ |  |
| 6 | $R_6 = -1.50$ | $T_6 = 0.035$ | 1.847 |
|  | $R'_6 = +0.92$ |  |  |
|  |  | $S_6 = 0.00$ |  |
| 7 | $R_7 = +0.92$ | $T_7 = 0.240$ | 1.788 |
|  | $R'_7 = -0.92$ |  |  |
|  |  | $S_7 = 0.001$ |  |
| 8 | $R_8 = -36.00$ | $T_8 = 0.095$ | 1.788 |
|  | $R'_8 = -1.65985$ |  |  | wherein all linear dimensions of radii, thicknesses, and spacings are expressed in proportion to the equivalent focal length of the entire lens system, which is considered as unity.

12. A lens as defined in claim 1, wherein the characteristics of the lens components and their spatial relationship to each other are substantially in the proportions indicated by the data in the following table:

| Lens | Radii | Thicknesses and Spacings | N |
|---|---|---|---|
| 1 | $R_1 = \pm$ plane | $T_1 = 0.065$ | 1.565 |
|  | $R'_1 = +1.00$ |  |  |
|  |  | $S_1 = 0.300$ |  |
| 2 | $R_2 = +1.40$ | $T_2 = 0.080$ | 1.508 |
|  | $R'_2 = +0.92$ |  |  |
|  |  | $S_2 = 0.355\ (\alpha)$ |  |
| 3 | $R_3 = +1.40$ | $T_3 = 0.280$ | 1.713 |
|  | $R'_3 = -1.92$ |  |  |
|  |  | $S_3 = 0.015$ |  |
| 4 | $R_4 = +0.81$ | $T_4 = 0.240$ | 1.713 |
|  | $R'_4 = +0.79$ |  |  |
|  |  | $S_4 = 0.250 = CS$ |  |
| 5 | $R_5 = -6.00$ | $T_5 = 0.075$ | 1.508 |
|  | $R'_5 = +1.50$ |  |  |
|  |  | $S_5 = 0.110$ |  |
| 6 | $R_6 = -1.50$ | $T_6 = 0.035$ | 1.847 |
|  | $R'_6 = +0.92$ |  |  |
|  |  | $S_6 = 0.00$ |  |
| 7 | $R_7 = +0.92$ | $T_7 = 0.240$ | 1.788 |
|  | $R'_7 = -0.92$ |  |  |
|  |  | $S_7 = 0.001$ |  |
| 8 | $R_8 = \pm$ plane | $T_8 = 0.104574$ | 1.788 |
|  | $R'_8 = -1.66895$ |  |  | wherein all linear dimensions of radii, thicknesses, and spacings are expressed in proportion to the equivalent focal length of the entire lens system, which is considered as unity.

13. A lens as defined in claim 1, wherein the characteristics of the lens components and their spatial relationship to each other are substantially in the proportions indicated by the data in the following table:

| Lens | Radii | Thicknesses and Spacings | N |
|---|---|---|---|
| 1 | $R_1 = +2.368$ | $T_1 = 0.0667$ | 1.662 |
|  | $R'_1 = +0.912$ |  |  |
|  |  | $S_1 = 0.1425$ |  |
| 2 | $R_2 = +1.558$ | $T_2 = 0.0672$ | 1.435 |
|  | $R'_2 = +0.802$ |  |  |
|  |  | $S_2 = 0.4096\ (\alpha)$ |  |
| 3a | $R_{3a} = +1.129$ | $T_{3a} = 0.6026$ | 1.721 |
|  | $R'_{3a} = -0.723$ |  |  |
|  |  | $S_{3a} = 0.0000$ |  |
| 3b | $R_{3b} = -0.723$ | $T_{3b} = 0.0687$ | 1.730 |
|  | $R'_{3b} = -1.880$ |  |  |
|  |  | $S_{3b} = 0.0014$ |  |
| 4 | $R_4 = +0.842$ | $T_4 = 0.0945$ | 1.731 |
|  | $R'_4 = +1.017$ |  |  |
|  |  | $S_4 = 0.1860 = CS$ |  |
| 5 | $R_5 = -2.439$ | $T_5 = 0.0455$ | 1.516 |
|  | $R'_5 = +1.086$ |  |  |
|  |  | $S_5 = 0.1476$ |  |
| 6 | $R_6 = -1.205$ | $T_6 = 0.0343$ | 1.847 |
|  | $R'_6 = +1.300$ |  |  |
|  |  | $S_6 = 0.0000$ |  |
| 7 | $R_7 = +1.300$ | $T_7 = 0.2574$ | 1.788 |
|  | $R'_7 = -0.840$ |  |  |
|  |  | $S_7 = 0.0020$ |  |
| 8 | $R_8 = +2.680$ | $T_8 = 0.1000$ | 1.788 |
|  | $R'_8 = -3.65657$ |  |  | wherein all linear dimensions of radii, thicknesses, and spacings are expressed in proportions to the equivalent focal length of the entire lens system, which is considered as unity.

14. A lens as defined in claim 1, wherein the characteristics of the lens components and their spatial relationship to each other are substantially in the proportions indicated by the data in the following table:

| Lens | Radii | Thicknesses and Spacings | N |
|---|---|---|---|
| 1 | $R_1 = +2.650$ | $T_1 = 0.0670$ | 1.626 |
|  | $R'_1 = +0.790$ |  |  |

-Continued

| Lens | Radii | Thicknesses and Spacings | N |
|---|---|---|---|
| 2 | $R_2 = +1.237$ | $S_1 = 0.1360$ | |
| | | $T_2 = 0.0900$ | 1.459 |
| | $R'_2 = +0.891$ | $S_2 = 0.4705\ (\alpha)$ | |
| 3a | $R_{3a} = +1.164$ | $T_{3a} = 0.5370$ | 1.742 |
| | $R'_{3a} = -0.738$ | $S_{3a} = 0.0000$ | |
| 3b | $R_{3b} = -0.738$ | $T_{3b} = 0.0610$ | 1.773 |
| | $R'_{3b} = -1.771$ | $S_{3b} = 0.0025$ | |
| 4 | $R_4 = +0.827$ | $T_4 = 0.1045$ | 1.730 |
| | $R'_4 = +1.015$ | $S_4 = 0.1830 = CS$ | |
| 5 | $R_5 = -3.625$ | $T_5 = 0.0525$ | 1.492 |
| | $R'_5 = +0.832$ | $S_5 = 0.1830$ | |
| 6 | $R_6 = -1.216$ | $T_6 = 0.0350$ | 1.847 |
| | $R'_6 = +1.040$ | $S_6 = 0.0000$ | |
| 7 | $R_7 = +1.040$ | $T_7 = 0.2145$ | 1.787 |
| | $R'_7 = -1.040$ | $S_7 = 0.0020$ | |
| 8 | $R_8 = +3.735$ | $T_8 = 0.0970$ | 1.788 |
| | $R'_8 = -1.7114$ | | | wherein all linear dimensions of radii, thicknesses, and spacings are expressed in proportion to the equivalent focal length of the entire lens system, which is considered as unity.

15. A lens as defined in claim 1, wherein the characteristics of the lens components and their spatial relationship to each other are substantially in the proportions indicated by the data in the following table:

| Lens | Radii | Thicknesses and Spacings | N |
|---|---|---|---|
| 1 | $R_1 = +4.171$ | $T_1 = 0.0660$ | 1.623 |
| | $R'_1 = +0.783$ | $S_1 = 0.1940$ | |
| 2 | $R_2 = +2.351$ | $T_2 = 0.1020$ | 1.617 |
| | $R'_2 = +1.426$ | $S_2 = 0.2930\ (\alpha)$ | |
| 3a | $R_{3a} = +1.253$ | $T_{3a} = 0.5390$ | 1.713 |
| | $R'_{3a} = -0.795$ | $S_{3a} = 0.0000$ | |
| 3b | $R_{3b} = -0.795$ | $T_{3b} = 0.0660$ | 1.749 |
| | $R'_{3b} = -1.688$ | $S_{3b} = 0.0020$ | |
| 4 | $R_4 = +0.777$ | $T_4 = 0.1730$ | 1.731 |
| | $R'_4 = +0.916$ | $S_4 = 0.2160 = CS$ | |
| 5 | $R_5 = -4.710$ | $T_5 = 0.0500$ | 1.461 |
| | $R'_5 = +0.968$ | $S_5 = 0.1670$ | |
| 6 | $R_6 = -1.310$ | $T_6 = 0.500$ | 1.847 |
| | $R'_6 = +1.310$ | $S_6 = 0.0000$ | |
| 7 | $R_7 = +1.310$ | $T_7 = 0.2000$ | 1.788 |
| | $R'_7 = -0.979$ | $S_7 = 0.0020$ | |
| 8 | $R_8 = +6.916$ | $T_8 = 0.1100$ | 1.788 |
| | $R'_8 = -1.6943$ | | | wherein all linear dimensions of radii, thicknesses, and spacings are expressed in proportion to the equivalent focal length of the entire lens system, which is considered as unity.

16. A lens as defined in claim 1, wherein the characteristics of the lens components and their spatial relationship to each other are substantially in the proportions indicated by the data in the following table:

| Lens | Radii | Thicknesses and Spacings | N |
|---|---|---|---|
| 1 | $R_1 = +9.870$ | $T_1 = 0.0650$ | 1.575 |
| | $R'_1 = +0.961$ | $S_1 = 0.2950$ | |
| 2 | $R_2 = +1.495$ | $T_2 = 0.0840$ | 1.509 |
| | $R'_2 = +0.920$ | $S_2 = 0.3650\ (\alpha)$ | |
| 3 | $R_3 = +1.341$ | $T_3 = 0.3900$ | 1.713 |
| | $R'_3 = -2.047$ | $S_3 = 0.0010$ | |
| 4 | $R_4 = +0.805$ | $T_4 = 0.2400$ | 1.713 |
| | $R'_4 = +0.825$ | $S_4 = 0.2400 = CS$ | |
| 5 | $R_5 = -6.005$ | $T_5 = 0.0650$ | 1.509 |
| | $R'_5 = +1.410$ | $S_5 = 0.1000$ | |
| 6 | $R_6 = -1.508$ | $T_6 = 0.0600$ | 1.847 |
| | $R'_6 = +0.920$ | $S_6 = 0.0000$ | |
| 7 | $R_7 = +0.920$ | $T_7 = 0.2400$ | 1.788 |
| | $R'_7 = -0.979$ | $S_7 = 0.0100$ | |
| 8 | $R_8 = +25.40$ | $T_8 = 0.0950$ | 1.788 |
| | $R'_8 = -1.68068$ | | | wherein all linear dimensions of radii, thicknesses, and spacings are expressed in proportion to the equivalent focal length of the entire lens system, which is considered as unity.

17. A lens as defined in claim 1, wherein the characteristics of the lens components and their spatial relationship to each other are substantially in the proportions indicated by the data in the following table:

| Lens | Radii | Thicknesses and Spacings | N | V |
|---|---|---|---|---|
| 1 | $R_1 = +6.4168$ | $T_1 = 0.06664$ | 1.5814 | 40.9 |
| | $R'_1 = +0.9717$ | $S_1 = 0.24624$ | | |
| 2 | $R_2 = +1.7468$ | $T_2 = 0.07661$ | 1.4645 | 65.7 |
| | $R'_2 = +0.8874$ | $S_2 = 0.36996\ (\alpha)$ | | |
| 3 | $R_3 = +1.2616$ | $T_3 = 0.41826$ | 1.7130 | 53.9 |
| | $R'_3 = -2.0567$ | $S_3 = 0.00144$ | | |
| 4 | $R_4 = +0.8957$ | $T_4 = 0.23761$ | 1.7130 | 53.9 |
| | $R'_4 = +1.0042$ | $S_4 = 0.18149 = CS$ | | |
| 5 | $R_5 = -3.7242$ | $T_5 = 0.13173$ | 1.4645 | 65.7 |
| | $R'_5 = +1.0370$ | $S_5 = 0.12334$ | | |
| 6 | $R_6 = -1.7566$ | $T_6 = 0.02709$ | 1.8467 | 23.8 |
| | $R'_6 = +0.8323$ | $S_6 = 0.00000$ | | |
| 7 | $R_7 = +0.8323$ | $T_7 = 0.23932$ | 1.7883 | 47.4 |
| | $R'_7 = -1.0578$ | | | |

-Continued

| Lens | Radii | Thicknesses and Spacings | N | V |
|---|---|---|---|---|
| 8 | $R_8 = +6.2880$ | $S_7=0.00170$ | | |
| | $R'_8 = -1.75655$ | $T_8=0.10385$ | 1.7883 | 47.4 | wherein all linear dimensions of radii, thicknesses, and spacings are expressed in proportion to the equivalent focal length of the entire lens system, which is considered as unity.

18. A lens as defined in claim 1, wherein the characteristics of the lens components and their spatial relationship to each other are substantially in the proportions indicated by the data in the following table:

| Lens | Radii | Thicknesses and Spacings | N | V |
|---|---|---|---|---|
| 1 | $R_1 = +8.3325$ | $T_1=0.06327$ | 1.5827 | 46.5 |
| | $R'_1 = +0.9281$ | $S_1=0.32654$ | | |
| 2 | $R_2 = +1.3301$ | $T_2=0.09243$ | 1.5481 | 45.8 |
| | $R'_2 = +0.9281$ | $S_2=0.33507\ (\alpha)$ | | |
| 3a | $R_{3a} = +1.3016$ | $T_{3a}=0.18569$ | 1.7130 | 53.9 |
| | $R'_{3a} = -11.273$ | $S_{3a}=0.08308$ | | |
| | $R_{3b} = -47.565$ | | | |
| 3b | $R'_{3b} = -2.0928$ | $T_{3b}=0.13480$ | 1.7130 | 53.9 |
| | | $S_{3b}=0.00138$ | | |
| 4 | $R_4 = +0.7809$ | $T_4=0.18377$ | 1.7130 | 53.9 |
| | $R'_4 = +0.8332$ | $S_4=0.23576=CS$ | | |
| 5 | $R_5 = -6.9100$ | $T_5=0.06768$ | 1.5481 | 45.8 |
| | $R'_5 = +1.1271$ | $S_5=0.12765$ | | |
| 6 | $R_6 = -1.1854$ | $T_6=0.04429$ | 1.8467 | 23.8 |
| | $R'_6 = +1.3987$ | $S_6=0.00000$ | | |
| 7 | $R_7 = +1.3987$ | $T_7=0.19917$ | 1.7883 | 47.4 |
| | $R'_7 = -0.9416$ | $S_7=0.01706$ | | |
| 8 | $R_8 = +8.8250$ | $T_8=0.10536$ | 1.7883 | 47.4 |
| | $R'_8 = -1.50293$ | | | | wherein all linear dimensions of radii, thicknesses, and spacings are expressed in proportion to the equivalent focal length of the entire lens system, which is considered as unity.

* * * * *